Sept. 23, 1941.  W. E. McDONELL  2,256,747
OPHTHALMIC MOUNTING
Filed Jan. 8, 1940
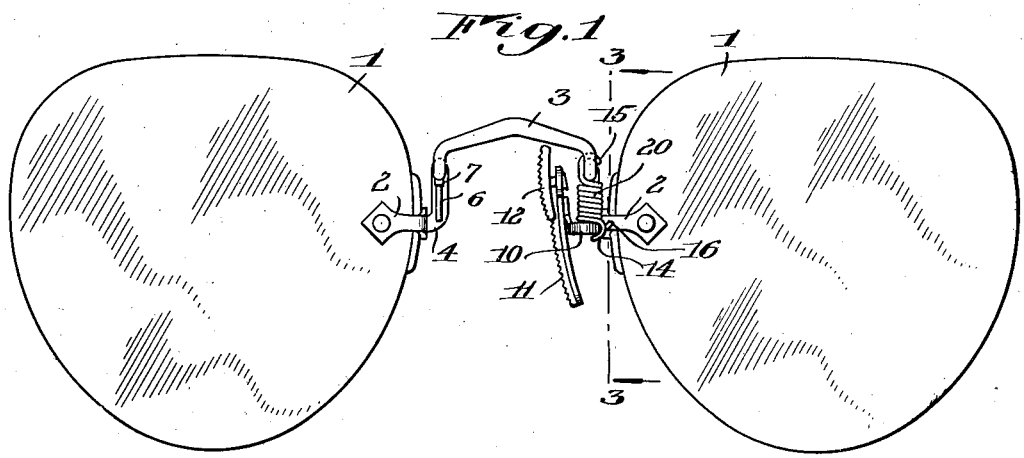
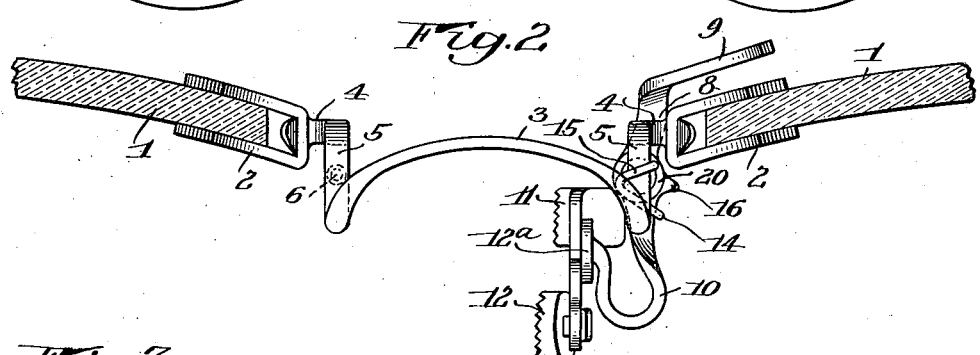
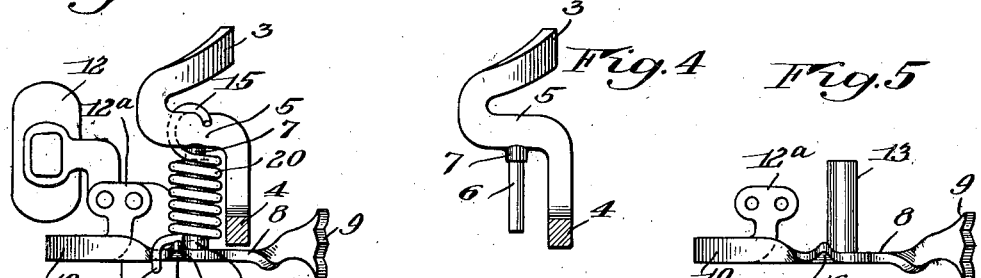
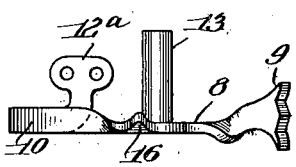
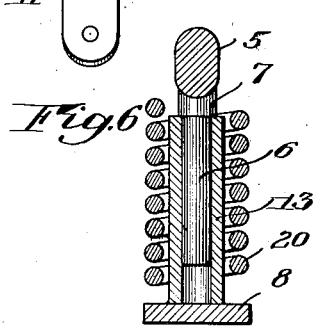
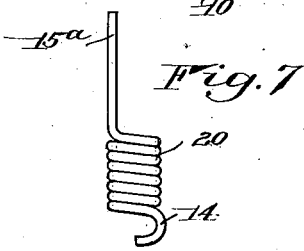
INVENTOR.
William E. McDonell
BY
his ATTORNEY.

Patented Sept. 23, 1941

2,256,747

UNITED STATES PATENT OFFICE 2,256,747

OPHTHALMIC MOUNTING

William E. McDonell, Rochester, N. Y., assignor to Shuron Optical Company, Inc., Rochester, N. Y., a corporation of New York Application January 8, 1940, Serial No. 312,888

4 Claims. (Cl. 88—50)

My present invention relates to optics and more particularly to ophthalmic mountings of the class known as finger piece mountings, in which the bridge and lens structure are held to the nose of the wearer by pivoted levers that carry the nose pads or guards toward and from the nose with accompanying spring pressure. The invention has for its general object to provide a simple and efficient eyeglass construction of this character that will promote the facility with which the mounting is originally assembled in manufacture and the facility with which it may be repaired and adjusted. The improvements are directed in part toward the whole spring and lever assembly; toward a novel manner of attaching the spring so that it functions to cause it alone to maintain the lever in its bearing and also toward a construction of the spring as an element that lends itself to foregoing objects while permitting the use of wire stock that is heavier and more durable than the gage, heretofore generally used.

To these and other ends, the invention resides in certain improvements and combinations of parts, all as will be hereinafter more fully described, the novel features being pointed out in the claims at the end of this specification.

In the drawing:

Figure 1 is a rear elevation of an ophthalmic mounting including attached lenses constructed in accordance with and illustrating one embodiment of my invention, one of the two complementary finger piece assemblies being complete and the other omitting the finger piece lever and its spring to show the pivot in elevation;

Figure 2 is a fragmentary top plan view, enlarged, of the showing of Figure 1;

Figure 3 is an enlarged, vertical section through a lens connection on the line 3—3 of Figure 1, showing a side elevation of one finger piece assembly;

Figure 4 is a similar detailed view of the bridge and finger piece bearing carried thereby on the same scale;

Figure 5 is a similar detailed view of the finger piece lever unit alone;

Figure 6 is a further enlarged vertical section through the finger piece pivot and transversely through the finger piece lever and its spring, and Figure 7 is a detailed elevation of the spring detached as it is originally furnished for manufacture or substitution.

Similar reference numerals throughout the several views indicate the same parts.

Inasmuch as the mounting as a whole comprises as usual a pair of finger piece levers that are complementary and identical except for lefts and rights, a description of one assembly will suffice for both.

Referring more particularly to the drawing, I indicates the lenses, 2 the usual lens straps secured thereto, 3 the bridge and 4 the connecting portions joining the bridge with the lens straps.

As is clearly shown in Figures 3 and 4 the bridge proceeds upwardly from the connection 4 and thence rearwardly, substantially horizontally at 5 before bending forwardly and upwardly to the main bow or arch 3. Depending from the underside of this rearward portion 5 is a vertical pivot pin 6 soldered or otherwise suitably secured thereto and having a shoulder 7 formed at its base or upper end. Describing it the other way around, the lower portion of this inverted pivot is reduced and is rearwardly offset from the connecting portion 4 and the adjacent rise of the bridge.

Each guard lever, shown best in Figures 2 and 5, comprises an intermediately horizontally flat stamped arm 8 and is twisted into a suitable laterally turned finger piece 9 at the front, while at the rear it is twisted into a horizontal loop 10, which offers facilities for adjusting the ultimate pressure of the nose pads against the nose, assuming that the lever has a limited swing for this purpose which is usual. This pad, in the present instance, comprises a lower portion 11 and an upper portion 12 riveted to the main lever at 12a, but such details of the actual nose contact are not important to the present invention as other forms of guards can be substituted.

At an intermediate point there rises from the lever, a bearing tube or sleeve 13 soldered thereto and in the present instance, closed at its lower end. This is fitted to the pivot 6 from below, the proportions being such that the lever clears the connection 4 and below it when the end of the bearing tube abuts the shoulder 7 of the pivot so that a definite and free pivotal cooperation is provided.

The spring that actuates this lever is a coiled, helically wound spring 20 shown in detail in Figure 7. Its tortional reflexes are utilized to actuate the guard lever on its pivot while its extensible reflexes are utilized as the sole means of holding the guard arm assembled upon its pivot. To these ends, the body of the spring surrounds the bearing sleeve 13 and its lower end has a laterally arranged hook 14 that engages under the lever. Its upper end has a preferably centrally arranged hook 15 that engages over the horizontal portion 5 of the bridge on the vertically opposite side thereof from the pivot base. The hook 14 rests in a sort of notch formed by an ear 16 on the lever and of course urges the rear end of the lever inwardly toward the nose.

As the spring is so hooked in position it is inert until energized so far as further actuating the finger piece is concerned (Figure 2). On the other hand, it is under slight longitudinal tension as shown by the separation of the coils in Figure 3 and Figure 6 so that the bearing sleeve 13 will be held tightly against the shoulder 7 with no lost motion or probable downward displacement.

As the spring is originally supplied for application to the mounting, the lower hook 14 may be completely formed to fit against the lever as described. The upper end, as shown at 15a in Figure 7, on the other hand, is preferably left as a straight extension. The original assembler thus drops the spring over tube 13, engages it at 14, applies the spring and tube over the pivot 6, carries the end 15a over the top of the bridge, bends it downward to the form shown at 15 in Figure 3 and snips it off. In substituting a new spring after use or modifying the spring tension similar manipulations are made by the repair man.

With such a method of construction and assembly, operation of the guard levers is simple. In themselves and in their application to the mounting as a whole, no screws or fastening devices are required nor are other additional parts involved at all. The spring itself has perfect freedom of motion and will not bind or wear. At the same time the spring is freely accessible as an outer element and its removal or application from the mounting does not necessarily involve its displacement from the lever by which it is carried as the two can be applied or removed together. In other words, in assembling, the spring is just dropped over the bearing tube on the lever and the latter then slipped onto the pivot post. Anyone familiar with the handling of these tiny springs will appreciate the facility offered by having it retained upon the relatively large lever while putting it in place.

It is also to be observed that with my construction the pivot bearing is completely closed at that end by the lever and the bearing element that it carries against the entrance of foreign matter. At the opposite end similar fouling of the friction surfaces is largely sealed by the provision of the shoulder 7.

It will, of course, be understood that the practice of my invention is not limited to the particular form of bridge or other supporting part for the pivot post 6. The type shown lends itself particularly well to the locating of the depending pivot post, but the latter might be attached in other ways, for instance, with the element 5 constituting merely an independent lug or bracket for this purpose on most any kind of a bridge. In the broader aspects of the invention the upper end of the spring can be anchored on any convenient relatively fixed part of the mounting or support.

I claim as my invention:

1. In an ophthalmic mounting, the combination with a combined bridge and lens connection having an anchoring lateral projection, of a downwardly projecting male pivotal extension proceeding from said projection a finger piece lever carrying a nose guard and provided with complementary female bearing means cooperating with said pivotal extension and a coiled actuating spring for the lever surrounding the bearing and also under extended tension longitudinally of its axis with one end hooked over the projection and the other over the guard lever whereby it also acts to retain the latter on the said pivotal extension solely by its extensible tension, said spring being freely independently detachable bodily with the bearing means upon the separation of the pivot bracket and such bearing means on the lever.

2. In an ophthalmic mounting, the combination with a combined bridge and lens connection, of a pivotal extension proceeding downwardly therefrom, a finger piece lever carrying a nose guard and provided with complementary upwardly projecting bearing means cooperating with said pivotal extension and a coiled actuating spring for the lever extensibly tensioned longitudinally and having one end engaging the latter and the other end hooked over a portion of the bridge and lens connection at a point in substantial alinement with the axis of the pivot.

3. In an ophthalmic mounting, the combination with a combined bridge and lens connection in which the base of the bridge rises from the lens connection and thence proceeds rearwardly substantially horizontally, of a pivot post depending from the said rearwardly proceeding portion of the bridge, a finger piece lever carrying a nose guard and provided with complementary bearing means cooperating with said pivot post, and a coiled actuating spring for the lever engaged at its two ends respectively with the latter and with the rearwardly proceeding portion of the bridge so that its extensible and retractable force is exerted to also maintain the bearing means of the finger piece lever upon the pivot post.

4. In an ophthalmic mounting, a pivotal connection between a finger piece guard lever and its support embodying in combination a pivot post projecting from one of said elements, a cooperating tubular bearing carried by the other element, the lever itself being completely closed on its under side and disposed wholly below the pivot so that it may be applied and removed in a direction downwardly axially thereof whereby the post and bearing tube are engaged and disengaged endwise, and a coiled spring for motivating the lever extensibly tensioned longitudinally and encircling the pivot, said spring having one end engaging the support directly above the pivot and the other engaging beneath the lever to hold it on its bearing.

WILLIAM E. McDONELL.